United States Patent [19]

Gloor

[11] Patent Number: 5,191,792
[45] Date of Patent: Mar. 9, 1993

[54] INSTRUMENT FOR INDICATING ALTITUDE OR DIRECTION

[75] Inventor: Hans Gloor, Biel, Switzerland
[73] Assignee: Recta AG, Biel, Switzerland
[21] Appl. No.: 723,816
[22] Filed: Jul. 1, 1991
[51] Int. Cl.$^5$ .............................................. G01C 21/00
[52] U.S. Cl. .............................. 73/178 R; 33/355 R; 73/384; 324/244; 340/970; 340/979; 364/443
[58] Field of Search ................ 73/384, 178 R, 178 T, 73/178 H; 33/355 R, 356, 361; 324/247, 249, 244; 364/449, 443, 444, 457; 340/970, 979

[56] References Cited

U.S. PATENT DOCUMENTS 4,319,487 3/1982 Haase et al. ........................... 73/384
5,067,081 11/1991 Person .............................. 73/178 R

FOREIGN PATENT DOCUMENTS

WO85/0544 12/1985 PCT Int'l Appl. .
663092 11/1987 Switzerland .

Primary Examiner—Donald O. Woodiel
Attorney, Agent, or Firm—Michael Ebert

[57] ABSTRACT

A hand-held instrument adapted selectively to provide a sportsman, such as a mountain climber, with readily-readable indications of the existing altitude or direction. The instrument includes a magnetometer which yields an analog signal as a function of direction and a pressure sensor which yields an analog signal as a function of atmospheric pressure. These analog signals are converted into corresponding digital signals and applied to a microprocessor which acts to control an LCD display having two display modes—one providing a numerical readout of altitude, the other a 360 degree readout of direction. When the microprocessor is switched to the altitude mode, it then processes the signal derived from the pressure sensor to yield a digital output for operating the display to indicate the existing altitude. When the microprocessor is switched to the direction mode, it then processes the signal derived from the magnetometer to yield a digital output for operating the display to indicate the existing direction.

11 Claims, 1 Drawing Sheet

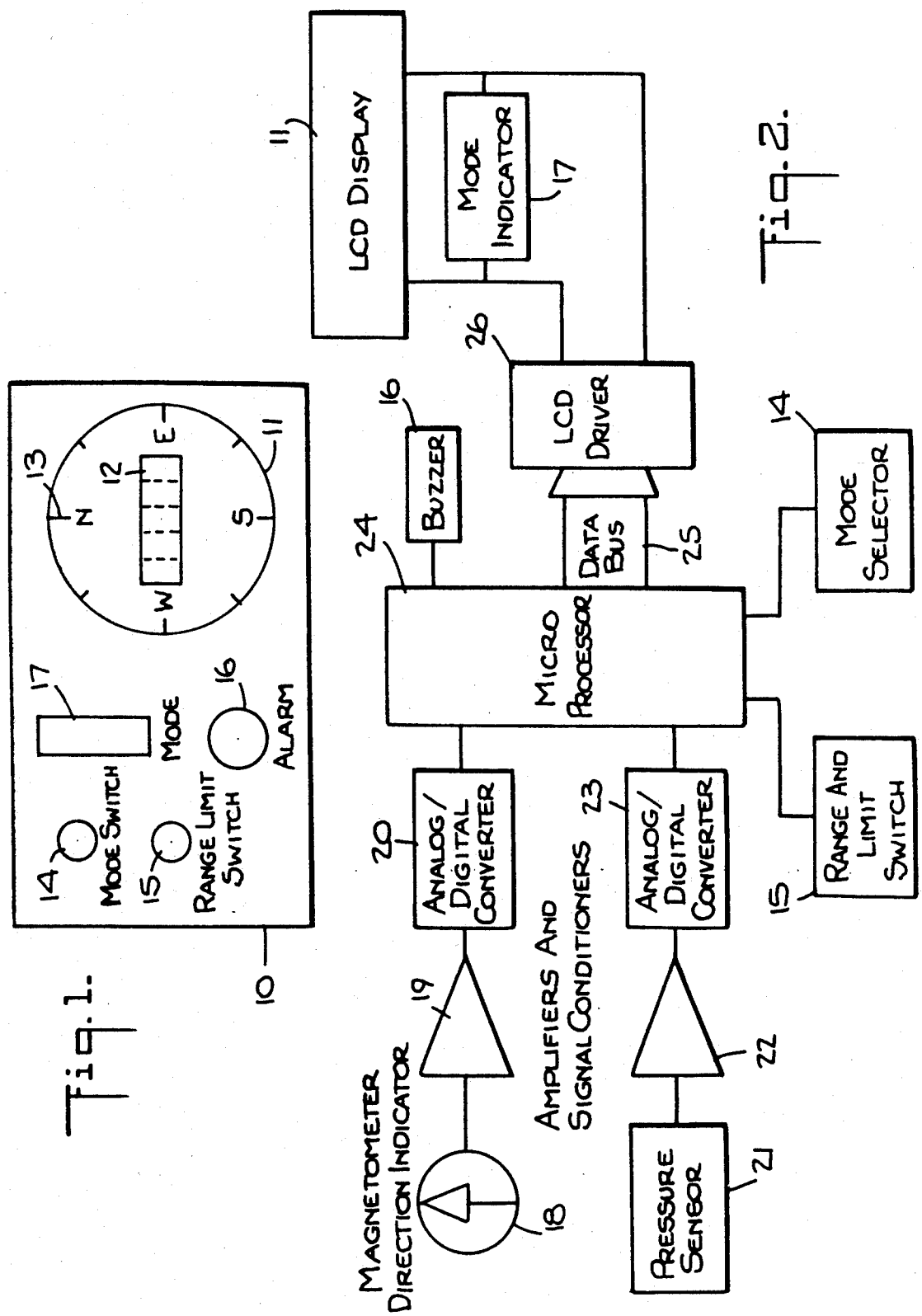

INSTRUMENT FOR INDICATING ALTITUDE OR DIRECTION

BACKGROUND OF INVENTION

1. Field of Invention

This invention relates generally to instruments for indicating direction and altitude, and more particularly to a hand-held instrument to provide a sportsman, such as a mountain climber, with readily-readable indications either of the existing direction or altitude.

2. Status of Prior Art

In certain types of sports activity, the need exists for instruments to indicate altitude and direction, so that the sportsman knows his elevation above sea level and the direction in which he is going. One popular type of sports activity involves a hang glider, which is an unpowered flying device that seeks to emulate the flight of soaring birds and takes advantage of rising convection currents and other air movements. Modern foot-launched hang gliders have flown over 160 kilometers and have reached about 6000 meters in altitude, the gliders remaining aloft for more than 15 hours.

The basic instruments that a hang-glider sportsman requires are an altimeter and a compass. Also in need of a compass and an altimeter are mountain climbers and hikers, for it is important for these sportsmen to know their existing altitude and the direction they are taking.

A conventional pressure altimeter senses the pressure of air at an elevated level and converts the sensed pressure value to an indication of height above sea level. For this purpose, use is generally made of an aneroid barometer having an evacuated capsule whose movement in response to changes in atmospheric pressure is sensed to provide an altitude reading. And the conventional direction indicator is a magnetic compass consisting of a magnetized needle mounted so as to be free to align itself with the horizontal component of the earth's magnetic field.

But sportsmen who operate a hang-glider or who climb mountains must not only have instruments that they can hand carry, but they must be able to read these instruments without difficulty under conditions of stress or under adverse environmental conditions. These instruments must not only be compact and light-weight, but it is vital that they also be reliable and accurate in operation and easily readable, even under difficult circumstances.

SUMMARY OF INVENTION

In view of the foregoing, the main object of this invention is to provide a hand-held instrument for use by a sportsman, such as a mountain climber, adapted to display readily-readable indications of the existing altitude or direction.

A significant advantage of an instrument in accordance with the invention is that it is highly compact and light-weight and therefore not burdensome to the sportsman.

More particularly, an object of this invention is to provide a microprocessor-controlled instrument of the above type which is switchable either to an altitude mode in which a common electronic display, such as an LCD or LED, affords a numerical indication of the existing altitude, or to a direction mode in which the display affords a direction indication on a 360-degree scale.

Briefly stated, these objects are attained in a hand-held instrument adapted selectively to provide a sportsman, such as a mountain climber, with readily-readable indications of the existing altitude or direction. The instrument includes a magnetometer which yields an analog signal as a function of direction and a pressure sensor which yields an analog signal as a function of atmospheric pressure. These analog signals are converted into corresponding digital signals and applied to a microprocessor which acts to control an LCD display having two display modes—one providing a numerical readout of altitude, the other a 360 degree readout of direction. When the microprocessor is switched to the altitude mode, this processes the signal derived from the pressure sensor to yield a digital output for operating the display to indicate the existing altitude. When the microprocessor is switched to the direction mode, it then processes the signal derived from the magnetometer to yield a digital output for operating the display to indicate the existing direction.

BRIEF DESCRIPTION OF DRAWINGS

For a better understanding of the invention as well as other objects and further features thereof, reference in conjunction with the accompanying drawings, wherein:

FIG. 1 illustrates the front panel of an instrument in accordance with the invention; and FIG. 2 is a block diagram of the instrument.

DESCRIPTION OF INVENTION

Referring now to FIG. 1, there is shown a preferred embodiment of a hand-held instrument in accordance with the invention, the instrument being both light-weight and compact so that it is usable by a sportsman in the field or under other circumstances where conventional instruments would be burdensome or unacceptable. The instrument is housed in a case 10 having a battery compartment (not shown) for powering the electronic components of the instrument.

Mounted on the front panel of case 10 is an electronic display 11 which is of the LCD, LED or plasma display type, the size of the display being relatively large so that it is easily readable. When the instrument is operated in the altitude mode, display 11 provides a numerical readout of altitude (in meters or feet) on a register 12 at the center of the display. When the instrument is operated in the magnetic direction mode, a direction readout is produced incrementally along the indicia of a 360 degree scale 13 surrounding register 12.

Scale 13 consists of a ring of equi-spaced segments (LCD or LED) which are selectively activated so that if the segment at 0° is activated, this indicates North, if the 90° segment is activated, this indicates East, if the 180° segment is activated, this indicates South, and if the 270° signal is activated, this indicates West. Activation of the other segments indicates directions intermediate the cardinal points of the compass.

A mode switch 14, which is button actuated, selects the mode at which the instrument is operative. Hence when switch 14 is depressed by the operator, the instrument will then function in the altitude mode, and when the button is released to resume its normal position, the instrument will then function in the direction mode. Or the switch arrangement may be such as to operate in the reverse manner.

The measuring range of the instrument is selected by a range switch 15 of the button type. Thus when this switch is depressed, the altitude range will be, say, from 0 to 2500 meters, and when the switch is released, the range is then from 2500 to 5000 meters. These ranges are given only by way of example.

An alarm buzzer or loudspeaker 16 is provided which is activated to produce an audible warning signal only when a predetermined limit in the selected range has been exceeded, or has not been reached. Also provided is an electronic mode display 17 which indicates which mode is in effect.

Hence the operator of the instrument has only two controls to operate—switches 14 and 15. In practice, instead of a mechanical mode switch 14, use may be made of a voice-activated, solid state switch which is actuated only when the operator says a certain word, such as HELLO, the switch otherwise being inactive.

Referring now to FIG. 2, it will be seen that the instrument includes a magnetometer 18 to sense the existing direction. The magnetometer is preferably of the flux gate type whose operation is based upon the change of permability of a highly sensitive material in a weak magnetic field. Magnetometer 18 yields an analog signal which is a function of magnetic direction, this signal being amplified and conditioned in an amplifier 19 whose output is applied to an analog-to-digital converter 20.

Also included in the instrument is a pressure sensor 21 which is responsive to the existing atmospheric pressure. The pressure sensor may be a piezoelectric element of the type used in pressure transducers to produce an analog signal that is a function of pressure. Or it may be of the semiconductor type, such as a doped silicon ($S_1$) wafer or block that is subjected to strain as a function of the existing atmospheric pressure. The analog signal from pressure sensor 21 is fed through amplifier and signal conditioner 22 to an analog-digital converter 23 which yields a corresponding digital signal.

The digital signals from D to A converters 20 and 23 are fed into the input of a microprocessor 24. This is constituted by a central processing unit on a single integrated circuit chip that includes an instruction register, a control memory and an arithmetic/logic unit.

Microprocessor 24 is controlled by mode selector switch 14, so that when it functions in the direction mode, it then processes the digital data derived from magnetometer 18 to provide a digital output. This is applied through a data bus 25 to an LCD driver 26 whose output is applied to LCD display 11 to activate the direction readout scale 13 and thereby provide a reading of direction. Mode indicator 17 then indicates that the display is operating in the direction mode.

When mode selector switch 14 is operated to cause microprocessor 24 to function in the altitude mode, then the microprocessor processes the digital data derived from pressure sensor 24 to provide a digital output for activating the numerical altitude readout 12 of the LCD display 11. By operating range selector switch 15, the microprocessor will then operate in the selected range. And buzzer 16 coupled to the microprocessor will be activated only when a predetermined limit in the range has been exceeded, or has not been reached, depending on how the microprocessor is programmed. Thus for a sportsman, certain altitude levels may be dangerous, and it is important that he knows when he is in danger. For use with a hang-glider, the microprocessor may be programmed to indicated, instead of altitude, vertical speed; that is, the rate at which the altitude changes per unit of time.

The invention is not limited to the integration of a pressure sensor and a direction indicator in a single hand-held instrument. Thus the instrument may include a temperature sensor, a radioactivity intensity sensor, or an ultraviolet or infrared sensor, all of which yield analog signals that are converted into corresponding digital signals which are applied to the microprocessor to produce a numerical readout of that sensor which is selected to be read. And the instrument may include physiological sensors, such as pulse rate, blood pressure and respiration rate sensors, so as to selectively provide readouts during sporting or professional activity.

While there has been shown and described a preferred embodiment of an instrument for indicating altitude or direction in accordance with the invention, it will be appreciated that many changes and modifications may be made therein without, however, departing from the essential spirit thereof.

I claim:

1. A hand-held instrument for selectively indicating at least two different variables, such as altitude and direction, said instrument comprising:
   (a) a first sensor responsive to one of the variables to produce an analog signal corresponding thereto;
   (b) a second sensor responsive to the other variable to produce an analog signal corresponding thereto;
   (c) a microprocessor having an input and an output;
   (d) means to convert the first sensor signal into a first digital value and to apply said value to the input of said microprocessor;
   (e) means to convert the second sensor signal into a second digital value and to apply said value to the input of said microprocessor:
   (f) a function selector switch coupled to said microprocessor to render it operative either in a first mode to process said first value to provide an output representing said first variable, or in a second mode to process said second value to provide an output representing said second variable; and
   (g) an electronic display coupled to the output of the microprocessor to indicate said first and second values.

2. An instrument as set forth in claim 1, wherein said first sensor is a magnetometer which yields an analog signal as a function of magnetic direction.

3. An instrument as set forth in claim 2, in which said magnetometer is of the flux-gate type.

4. An instrument as set forth in claim 1, wherein said second sensor is a pressure-sensitive transducer that yields an analog signal as a function of altitude.

5. An instrument as set forth in claim 4, wherein said transducer is of the silicon type.

6. An instrument as set forth in claim 4, further including a range selector switch coupled to said microprocessor to render the microprocessor operative in said second mode in a selected altitude range.

7. An instrument as set forth in claim 1, further including a mode indicator coupled to the output of the microprocessor to indicate which mode is in effect.

8. An instrument as set forth in claim 1, further including an alarm coupled to the microprocessor which is activated when an output representing a variable exceeds or falls below a predetermined limit.

9. An instrument as set forth in claim 1, wherein the first section of the display is a numerical readout.

10. An instrument as set forth in claim 1, wherein the first variable is magnetic direction and the second variable is altitude, and said electronic display includes a first section in the form of a 360 degree scale on which direction is indicated, and a second section in the form of a numerical readout to indicate altitude.

11. An instrument as set forth in claim 10, wherein said display is of the LCD type having segments which are selectively activated to form the numerical readout in the first section, and which are in a ring formation to define the 360 degree scale, the activated segment in the ring indicating direction.

* * * * *